Nov. 30, 1971  W. C. CHESNUT  3,623,280
HAND TOOL FOR SHARPENING CUTTING EDGES
Filed May 11, 1970  2 Sheets-Sheet 1
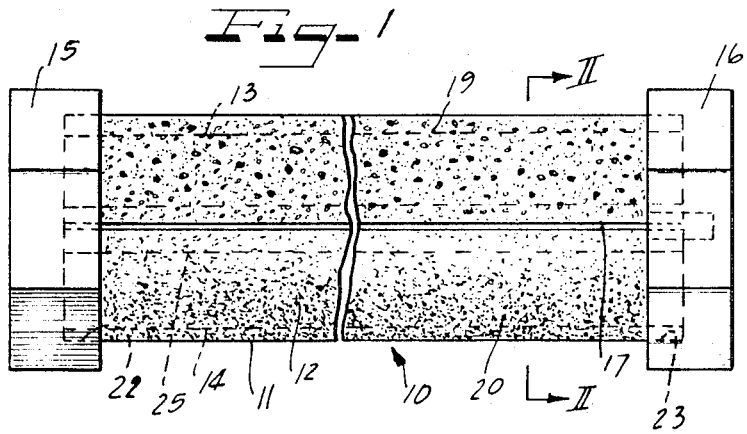
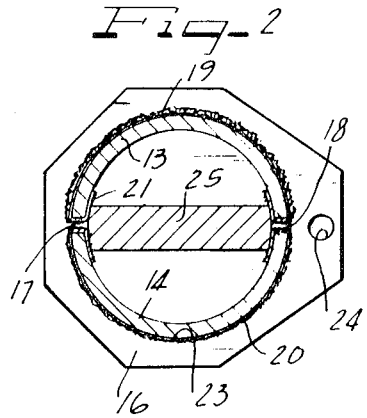
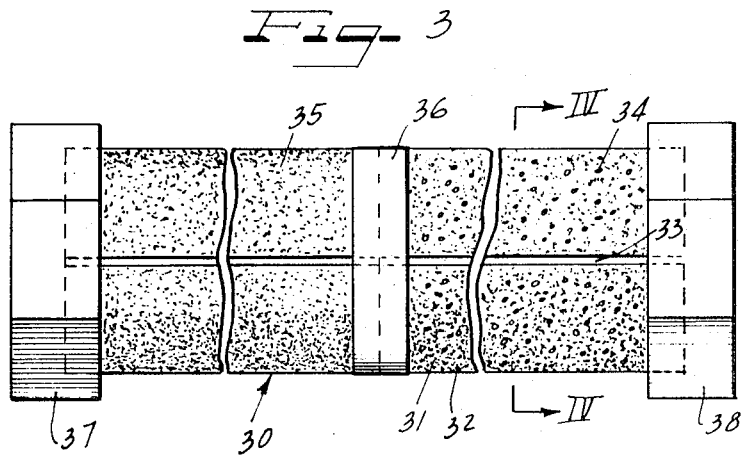
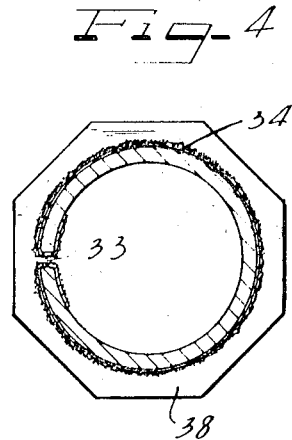
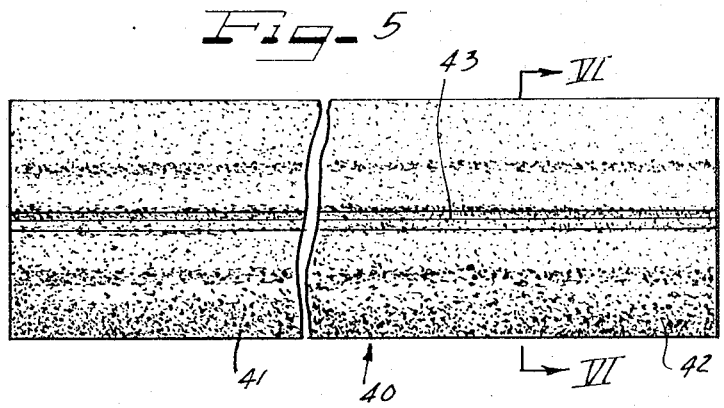
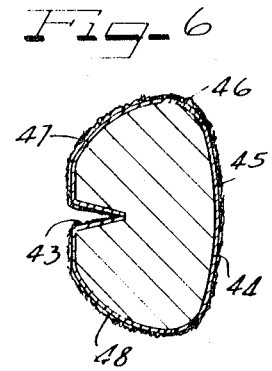
INVENTOR
WILLIAM C. CHESNUT
BY *Hill, Sherman, Meroni, Gross & Simpson* ATTORNEYS

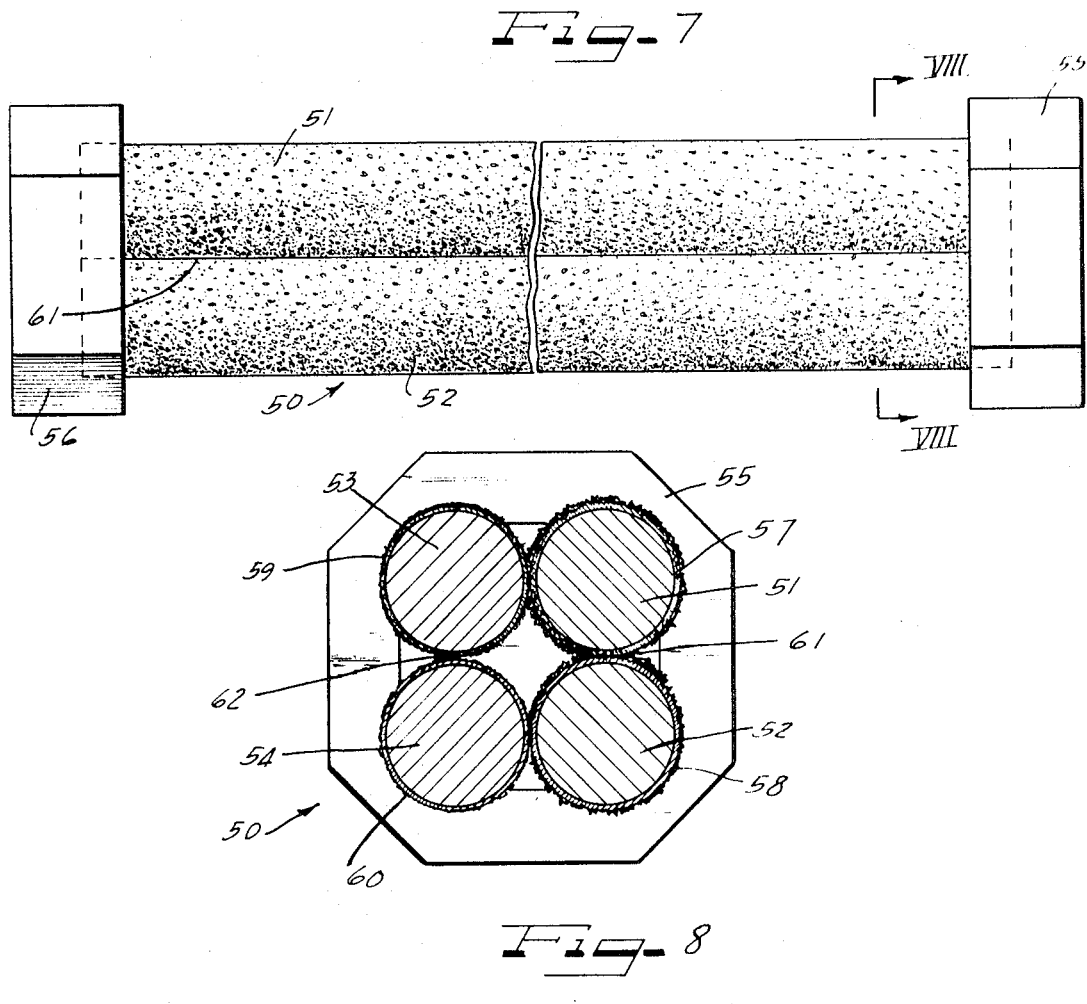

United States Patent Office 3,623,280
Patented Nov. 30, 1971

3,623,280
HAND TOOL FOR SHARPENING CUTTING EDGES
William C. Chesnut, 504 Augusta St.,
Racine, Wis. 53402
Filed May 11, 1970, Ser. No. 35,975
Int. Cl. B24b 9/10; B24d 15/08
U.S. Cl. 51—370
11 Claims

ABSTRACT OF THE DISCLOSURE

A hand tool for sharpening cutting edges characterized by a curved honing surface formed by a layer of abrasive particles for sharpening edges of the cutting device such as a knife which curved surface enables the sharpening of knife blades having a serrated or waverly cutting edge. In the preferred embodiments the tool has an elongated slot or groove with sidewalls covered by the layer of abrasive particles to provide a point sharpening device. The elongated groove of the tool can be provided as a groove in a solid body member of the tool or as a slot in a tubular body member of the tool. The groove can also be defined by edges of assembled halves forming the body member of the tool, or by the curved surfaces of a plurality of body members assembled to form the tool.

BACKGROUND OF THE INVENTION

Field of the invention

The present invention is directed to a hand tool, particularly a hand tool useful in sharpening cutting edges such as serrated knife blades and the points of knives.

Prior art

In recent years cutting devices such as knives having a serrated cutting edge or a waverly cutting edge have been very popular. A problem with a knife with a serrated or waverly cutting edge is that it cannot be properly sharpened on a flat honing surface such as the common whetstone. Furthermore sharpening devices such as the common whetstone are an expensive item to manufacture and are thus not available in most homes for sharpening cutting edges such as knife blades.

SUMMARY OF THE INVENTION

The present invention is directed to a hand tool for sharpening cutting edges and particularly adapted to sharpening serrated or waverly edged knife blades. The hand tool utilizes a curved honing surface provided by a layer of abrasive material on an elongated body member having a curved surface. In the preferred embodiments, the hand tool is also provided with a groove means or a slot whose walls or edges are covered with the layer of abrasive particles to form a point sharpening means for sharpening a point of a cutting device as it is inserted and moved in the groove.

BRIEF DESCRIPTION OF THE DRAWINGS

FIG. 1 is a plan view of a hand tool according to the principles of the present invention;
FIG. 2 is a cross section taken along lines II—II of FIG. 1;
FIG. 3 is a plan view of an embodiment of a hand tool in accordance with the present invention;
FIG. 4 is a cross-sectional view taken along lines IV—IV in FIG. 3;
FIG. 5 is a plan view of another embodiment of a hand tool formed in accordance with the present invention;
FIG. 6 is a cross-section taken along lines VI—VI of FIG. 5;
FIG. 7 is a plan view of another embodiment of a hand tool formed in accordance with the present invention; and
FIG. 8 is a cross section taken along lines VIII—VIII of FIG. 5.

DESCRIPTION OF THE PREFERRED EMBODIMENT

Although the principles of the present invention are particularly useful in any tool used for sharpening a cutting edge of a cutting device, they are particularly useful in a hand tool generally indicated at 10 in FIG. 1 which hand tool has an elongated body member 11 having a curved honing surface 12 which is particularly adapted for sharpening knife blades especially those having a serrated or waverly edge.

The body member 11 of the tool 10 is formed by a pair of elongated portions 13 and 14 which are assembled together by holding means such as end portions 15 and 16 to form the elongated body member. As best illustrated in FIG. 2, each of the elongated portions 13 and 14 is substantially half of the tubular member and has a curved surface of a semi-circular cross-section extending between a pair of parallel edges. As assembled by the end members 15 and 16, the elongated portions 13 and 14 form a substantially cylindrical, hollow body member 11 having a pair of grooves or slots 17 and 18 extending parallel to the longitudinal axis of the body member.

To form the honing surface 12, the curved surfaces of the portions 13 and 14 are covered with a layer 19 and 20 respectively of abrasive particles. Each of the layers 19 and 20 extend around the edges of the portions 13 and 14 so that the sidewalls of the grooves 17 and 18 defined by the edges of the portions 13 and 14 are covered with abrasive particles to form means for sharpening the point of a cutting device such as a knife blade. As illustrated, the abrasive particles forming the layer 19 are substantially coarser than the particles forming the layer 20. Thus the honing surface 12 has a coarse honing surface or area provided by the layer 19 and a fine honing surface or area provided by the layer 20.

The layers such as 19 of abrasive particles can be applied directly to the curved surface of the portion 13 by conventional means such as impregnating abrasive particles in the curved surface or by coating the curved surface with an adhesive or binding material and then applying the abrasive particles. Another manner of providing the layer such as 19 of abrasive particles is by providing the particles on a sheet and then attaching the sheet to the curved surface of the portion 13. For example, emery cloth which is commercially available can be glued to the curved surface of the portion 13 wrapped around the parallel extending edges and cover a portion of the interior surface adjacent the edge such as illustrated at 21 (FIG. 2). To provide both the coarse and fine honing surfaces emery cloth having a grit number of 100 can be used for the coarse layer 19 and an emery cloth having a grit number of 220 can be used for the fine layer 20. A grit number of 100 means there are 100 particles per linear inch and the grit number of 220 means there are 220 particles per linear inch.

Each of the end members 15 and 16 is provided with a counterbore 22 and 23 respectively which telescopically receive the ends of the cylindrical body member 11 and can be attached thereto by conventional means such as an adhesive. The end members 15 and 16 are provided with a plurality of flat surfaces which as illustrated are eight in number to provide support surfaces for supporting the tool 10 on a flat surface such as a kitchen counter or table. The support surfaces also prevent the device from rolling when stored in a drawer or on a shelf and as illustrated the member 16 can be provided with a bored hole 24 which coacts with a hook for hanging the tool 10 on a wall during storage.

The elongated portions 13 and 14 were formed by splitting a common paper pulp core which is commonly used as a core for rolls of fabric. A paper core which has a diameter of approximately 1¾ inches, provides a desired curvature for the honing surface 12, although other diameters could be used. The portions 13 and 14 could be formed of other materials such as extruded plastic members or portions.

In utilizing the tool 10, a cutting edge such as a knife blade is moved back and forth on the curved surface in a stropping action to sharpen the blade. Due to the curvature of the honing surface 12, a serrated or waverly edge will move across the surface to sharpen both the high and low points of the edge. To sharpen the point of the knife, the point is inserted in a groove such as 17 and drawn therealong. In order for the layers such as 19 and 20 on the sidewalls of the groove such as 17 to be effective for sharpening a knife, they should be substantially in surface-to-surface engagement. If the groove 17 is too wide, the point sharpening feature will not be accomplished; however, the person using the tool can squeeze the portions 19 and 20 together to close the gap between the sidewalls of the groove.

In order to provide reinforcement for the portions 13 and 14 and a backup for the grooves 17 and 18, a reinforcing or support member can be inserted in the tubular body member 11 and attached such as by means of an adhesive adjacent the edges forming the grooves 17 and 18. With the provision of reinforcing member 25 which is preferably of wood or a soft plastic construction, the correct width for the grooves 17 and 18 can be maintained and the member 25 will provide additional strength for the portions 13 and 14.

An embodiment of the hand tool is generally indicated at 30 in FIG. 3, which hand tool has an elongated body member 31 having a curved honing surface 32. The body member 31 as best illustrated in FIG. 4 is a tubular member such as a paper pulp core having a circular cross-section and provided with a slot or groove 33 which extends parallel to the longitudinal axis of the member 31.

To provide the honing surface 32, layer 34 of abrasive particles covers the curved surface of the body member 31 and the sidewalls of the slot 33 to define the point sharpening means. As in the above described embodiment, abrasive particles can be applied either directly to the curved surface by use of adhesive or by being imbedded therein or can be provided on a sheet such as emery cloth which is subsequently glued or attached to the curved surface of the member 31. If it is desirable to provide both a coarse and a fine honing surface, axially spaced layers such as 34 and 35 of different particle size or grit numbers can be provided. If the surface layers 34 and 35 are provided on sheets such as by using emery cloth, it may be desirable to provide a tape such as 36 to mask the edges and to prevent their peeling away from the curved surface of the member 31. The tape 36 can be either transparent or can be of a bright color to add to esthetic value of the tool 30.

As in the above-described embodiment of FIG. 1, the tool 30 is provided with end members 37 and 38 each of which is provided with a counterbore portion for telescopically receiving the ends of the tubular body member 31 for increasing the rigidity of the body member. As in the above-described embodiment, the end portions 37 and 38, which can be of wood or plastic material, are provided with eight flat surfaces to provide support surfaces for supporting a tool on a table during the sharpening operation. It should be noted that the larger diameter of the end members 37 and 38 as with the members 15 and 16 provide blade guards to prevent the accidental cutting of the person performing the sharpening operation.

Another embodiment of a hand tool is generally indicated at 40 in FIG. 5 and comprises an elongated body member 41 having a honing surface 42. The body member 41 is a solid body provided with a longitudinally extending groove 43 which has a slight tapering cross-section with converging side walls as best illustrated in FIG. 6. The body portion 41 which can be formed from wood or can be an extruded plastic member is provided with a continuous curved surface 44 having curved portions such as 45, 46 and 47 which have different radius of curvature. The resulting cross section of the body member 41 is a non-circular cross-section which enables its storage on a shelf or a drawer without rolling.

To provide a honing surface 42, a layer 48 of abrasive particles is applied to the continuous curved surface 44 and to the tapering sidewalls of the groove 43 to define a point sharpening means. As in the above-described embodiments, the layer 48 can be provided by either a direct application of the abrasive particles to the curved surface or by applying a sheet such as emery cloth to the curved surface 44. While the entire honing surface 42 is illustrated as being of substantially the same coarseness, different areas of fine and coarse abrasive particles can be provided in a manner such as described with respect to the embodiment of FIG. 3.

Another embodiment of the hand tool is generally indicated at 50 in FIGS. 7 and 8 which is an elongated tool having a plurality of curved honing surfaces and knife sharpening means. The tool 50 is formed of a plurality of elongated body members 51, 52, 53 and 54 which are held together by end members 55 and 56 in a parallel arrangement. Each of the members 51–54 which are cylindrical wooden or plastic rods has a layer 57–60, respectively, of abrasive particles on their respective curved surfaces to define the plurality of honing surfaces. Each of the layers such as 57 can be formed by having the particles directly attached by either an adhesive or impregnation onto the curved surface of members such as 51 or can be formed by applying a sheet of material carrying the adhesive particles such as emery cloth. If both a coarse and fine honing surface is desired, the layers such as 57 and 58 can be coarse layers and the layers 59 and 60 can be layers of fine abrasive particles.

As best illustrated in FIG. 8, the arrangement of the members 51–54 to extend parallel to each other provides converging layers of abrasive particles such as 57 and 58 to define a point sharpening means 61 and the layers 59 and 60 to define a point sharpening means 62. The arrangement of the members 51 and 52 for example is such that they are substantially in tangential contact so that their respective layers 57 and 58 converge to a substantial line contact to form a groove means therebetween similar to the grooves formed in the previously described embodiments. To sharpen a point of a cutting edge such as a knife blade, the point is inserted in the point sharpening means 61 and drawn therealong. As in the described embodiment, both a coarse and a fine point sharpening means are provided.

As in the previously described embodiment the end members 55 and 56 are provided with a plurality of surfaces for providing support for the device on a flat surface during use of the tool and to prevent rolling of the tool when stored such as on a shelf or in a drawer. The end members 55 and 56 which are holding means are attached to the body members 51–54 by means such as counterbore for receiving the ends of each of the body members 51–54.

Each of the embodiments 10, 30, 40 and 50 could be provided with a handle if desired. It should also be noted that the above described embodiments are only examples of a structure utilizing the principles of the present invention. For example, the embodiment of the tool identified as 40 could be formed with any cross-section such as an oval which would provide both curved surfaces and flat surfaces for sharpening knife blades. It would also be within the scope of the present invention to form the portions such as 13 and 14 of the tool 10 from substantially solid half round type members which are either wood or extruded plastic members and then assembled the solid member to form the grooves 17 and 18 utilizing holding means such as the end members 15 and 16.

Although minor modifications might be suggested by those versed in the art, it should be understood that I wish to employ within the scope of the patent warranted hereon all such modifications that reasonably and properly come within the scope of my contribution to the art.

I claim as my invention:

1. A hand tool for sharpening a cutting edge of a cutting device comprising an elongated solid body member having a curved surface with the direction of curvature being transverse to the longitudinal axis of said member, said surface being covered by a layer of abrasive particles to form a honing surface, said body member having a longitudinally extending groove having converging side walls to provide a pair of facing surface portions covered by the layer of abrasive particles to define a point sharpener, so that the cutting edge of the cutting device is sharpened by movement along said honing surface and a point of the cutting device is sharpened by being inserted between said facing surface portions of the point sharpener and move therealong.

2. A hand tool according to claim 1 which further includes means attached to one end of said elongated member for holding said tool during a sharpening operation.

3. A hand tool according to claim 1, wherein said curved surface of said body member has a varying radius of curvature so that said body member has a non-circular tranverse cross-section.

4. A hand tool according to claim 1, wherein said layer of abrasive particles is disposed on a sheet of material applied to said body member with a portion of said sheet covering each of the facing surface portions which form said point sharpener.

5. A hand tool for sharpening a cutting edge of a cutting device comprising a single elongated body member having a curved surface with the direction of curvature being transverse to the longitudinal axis of said member, said surface being covered by a layer of abrasive particles to form a honing surface, said body member being a hollow tubular member with a slot extending through the wall of said tubular member to provide a pair of facing surface portions covered by the layer of abrasive particles to define a point sharpener, and holding means attached at each end of said body member for increasing the rigidity of said tubular member and providing support surfaces for supporting said tool on a flat surface during a sharpening operation so that the cutting edge of the cutting device is sharpened by movement along said honing surface and a point of the cutting device is sharpened by being inserted between said facing surface portions of the point sharpener and move therealong.

6. A hand tool for sharpening a cutting edge of a cutting device comprising a single elongated body member which is formed from a pair of elongated portions and holding means, each of the said elongated portions having a pair of parallel extending edges with a curved surface of a substantially semi-circular cross section extending therebetween with the direction of curvature being transverse to the longitudinal axis of said portion, said holding means assembling said elongated portion with the edges defining walls of a pair of parallel extending groove means, each of the elongated portions having a layer of abrasive particles covering its curved surface to form a honing surface and covering the parallel edges to form a point sharpening means of each of the extending groove means, so that the cutting edge of a cutting device is sharpened by movement along said honing surface and a point of the cutting device is sharpened by being inserted into either of the pairs of groove means and moved therein.

7. A hand tool according to claim 6, wherein said layer of abrasive particles includes at least two areas of different sized particles so that the honing surface has a coarse and fine honing area.

8. A hand tool according to claim 6 wherein each of said elongated portions is a half of a cylindrical tube so that as assembled by said holding means said elongated body member is a hollow tubular member and said tool further includes a support member disposed in said tubular member, said support member being attached to each of the elongated portions adjacent the edges defining said grooves to reinforce said elongated body member and to provide a backing member at each of said pair of grooves.

9. A hand tool for sharpening a cutting edge of a cutting device comprising at least one elongated body member having a curved surface with the direction of curvature being transverse to the longitudinal axis of said member, said surface being covered by a layer of abrasive particles to form a honing surface said tool having at least a pair of facing surface portions covered by the layer of abrasive particles to define a point sharpener, and an end member disposed at each end of said elongated body member, each of said end member having a cross-section greater than the cross-section of said body member, one of said end members having means coactable with a hook enabling the hanging of said tool on a wall, so that the cutting edge of the cutting device is sharpened by movement along said honing surface and a point of the cutting device is sharpened by being inserted between said facing surface portions of the point sharpener and move therealong.

10. A hand tool for sharpening a cutting edge of a cutting device comprising more than one elongated body member each having a curved surface with the direction of curvature being transverse to the longitudinal axis of said member, each of said curved surfaces being covered with a layer of abrasive particles to form a honing surface, and means holding said body members in a parallel arrangement with portions of the covered curved surfaces of each body member facing a portion of the covered surface of an adjacent body member to form groove means of a point sharpening means so that the cutting edge of the cutting device is sharpened by movement along said honing surface and a point of the cutting device is sharpened by being inserted in said groove means and moved therein.

11. A hand tool according to claim 10, wherein said elongated body members are cylindrical members.

References Cited

UNITED STATES PATENTS

| | | | |
|---|---|---|---|
| 1,059,566 | 4/1913 | Rodgers | 51—211 |
| 2,103,320 | 12/1937 | Corff | 51—371 |
| 2,380,539 | 7/1945 | Miller | 51—211 X |

OTHELL M. SIMPSON, Primary Examiner

U.S. Cl. X.R.

51—211 R